US008876445B2

(12) United States Patent
Yanagida et al.

(10) Patent No.: US 8,876,445 B2
(45) Date of Patent: Nov. 4, 2014

(54) DRILL

(75) Inventors: Kazuya Yanagida, Anpachi-gun (JP);
Koichiro Naruke, Anpachi-gun (JP)

(73) Assignee: Mitsubishi Materials Corporation,
Tokyo (JP)

( * ) Notice: Subject to any disclaimer, the term of this patent is extended or adjusted under 35 U.S.C. 154(b) by 293 days.

(21) Appl. No.: 12/998,020

(22) PCT Filed: Sep. 4, 2009

(86) PCT No.: PCT/JP2009/065468
§ 371 (c)(1),
(2), (4) Date: May 10, 2011

(87) PCT Pub. No.: WO2010/029891
PCT Pub. Date: Mar. 18, 2010

(65) Prior Publication Data
US 2011/0211924 A1    Sep. 1, 2011

(30) Foreign Application Priority Data

Sep. 10, 2008 (JP) .................................. 2008-232232

(51) Int. Cl.
*B23B 51/02*    (2006.01)

(52) U.S. Cl.
CPC ........... *B23B 51/02* (2013.01); *B23B 2251/446* (2013.01); *B23B 2270/34* (2013.01); *B23B 2251/248* (2013.01); *B23B 2251/443* (2013.01); *B23B 2251/54* (2013.01)
USPC .......................................... 408/227; 408/230

(58) Field of Classification Search
CPC .................. B23B 2251/087; B23B 2251/245; B23B 2251/44; B23B 2251/443; B23B 2251/446
USPC .......................................... 408/227, 229, 230
IPC .............................................. B23B 51/00, 51/02
See application file for complete search history.

(56) References Cited

U.S. PATENT DOCUMENTS 2,897,695 A * 8/1959 Winslow ........................ 408/224
5,096,344 A    3/1992 Fischer
(Continued)

FOREIGN PATENT DOCUMENTS

CN    1910003 A    2/2007
DE    2541423 A *    3/1977
(Continued)

OTHER PUBLICATIONS

EPO website machine translation of DE 102006062429, printed Nov. 2012.*
(Continued)

*Primary Examiner* — Daniel Howell
(74) *Attorney, Agent, or Firm* — Edwards Wildman Palmer LLP

(57) ABSTRACT

A guide portion prevents the drilling hole from curving due to a skipping rope phenomenon, and also prevents the inner wall face of the drilling hole from being damaged, so that its surface roughness can be improved.
Chip evacuating flutes 4 are formed in the periphery of a drill body 1 which has a stick shape and is rotatable on its axis O, from its front flank 3 toward the rear side.
Cutting edges 2A are formed along ridge lines where the front flanks 3 intersect with wall faces 4A which are in the chip evacuating flutes 4 and face in a drill rotational direction T.
A cutting edge section 2, where the cutting edges 2A are formed, is provided in the front side of the drill body 1. A cutting edge section 2 has an external diameter which is smaller toward the rear side in the axis O direction than the external diameter D at the cutting edges 2A.
A guide portion 6 has a maximum external diameter part 6A at the front periphery side, and is provided to the rear side of the cutting edge section 2.
An external diameter at the maximum external diameter part 6A is larger than the external diameter at the rear of the cutting edge section 2, and is smaller than or equal to the external diameter D at the cutting edges 2A.
The maximum external diameter part 6A of the guide portion 6 shows a smooth convex curve shape in a rotatory figure obtained by rotating it on the axis O.

9 Claims, 2 Drawing Sheets

(56) References Cited

U.S. PATENT DOCUMENTS

| | | |
|---|---|---|
| 5,197,833 A | 3/1993 | Mayer et al. |
| 5,697,460 A | 12/1997 | Stewart et al. |
| 5,807,039 A | 9/1998 | Booher et al. |
| 2007/0237594 A1 | 10/2007 | Lang et al. |

FOREIGN PATENT DOCUMENTS

| | | | |
|---|---|---|---|
| DE | 19807429 A1 | * | 8/1999 |
| DE | 10 2006 062 429 A1 | | 7/2008 |
| JP | 48-114379 U | | 12/1973 |
| JP | 55150905 A | * | 11/1980 |
| JP | 56-48416 U | | 4/1981 |
| JP | 58040209 A | * | 3/1983 |
| JP | 04-075811 A | | 3/1992 |
| JP | 04-226707 | | 8/1992 |
| JP | 04-327684 | | 11/1992 |
| JP | 05050313 A | * | 3/1993 |
| JP | 2003340623 A | * | 12/2003 |
| JP | 2007-196318 | | 8/2007 |
| SU | 464398 A | * | 9/1975 |
| SU | 965627 A | * | 10/1982 |
| SU | 1103959 A | * | 7/1984 |
| SU | 1668054 A1 | * | 8/1991 |

OTHER PUBLICATIONS

EPO website machine translation of DE 19807429, printed Nov. 2012.*
Supplementary European Search Report dated Oct. 5, 2012, issued for the corresponding European Patent Application No. 09813037.0.
International Search Report dated Oct. 27, 2009, issued for PCT/JP2009/065468.
Office Action dated Oct. 9, 2012, issued for the corresponding Chinese patent application No. 200980135915.0.

* cited by examiner

DRILL

FIELD OF THE INVENTION

The present invention relates to a drill for drilling a hole in a workpiece. Further, this invention particularly relates to a drill having guide portions for guiding the cutting edge section in the tip, namely, in the front of the drill body.

BACKGROUND OF THE INVENTION

Patent Document 1, for example, discloses a drill which includes such a guide portion. This drill is a long drill having a guide on its land and the guide portion is located at a predetermined distance to the rear from the front of the drill. Also, in such a drill, the guide portion's diameter is smaller than or equal to the drill diameter at the point where the drill touches the face of a drilling hole.

Additionally, Patent Document 2 discloses a cutting edge-tipped drill in which: a tip composed of cutting edge(s) and margin(s), is attached thereto; and a guide pad having a helical or inclined shape, is provided on its shank.

To bore a hole with a drill having such a guide portion: the cutting edge section in the front of the drill body is fed. and bores a drilling hole; the guide portion is inserted into the drilling hole; then the guide portion slidingly contacts the inner wall face of the drilling hole.

This sliding contact prevents a so-called skipping rope phenomenon from occurring, even if the drill is a long drill as mentioned in Patent Document 1, namely, a drill in which: chip evacuating flutes are formed in the drill body and; the length of the chip evacuating flutes is significantly longer than the external diameter of its cutting edge. The skipping rope phenomenon is a phenomenon in which: while a drill is boring a hole, the drill body between the cutting edge section biting the drilling hole and the shank with which the drill is held to the spindle of a machine tool, vibrates and is deflected radially outward. Therefore, by preventing this phenomenon, the drilling hole can be prevented from curving, whereby linearity of the drilling hole can be ensured.
[Patent Document 1]
Japanese Unexamined Patent Application No. 2007-196318A
[Patent Document 2]
Japanese Utility Model No. S56[1981]-48416

DESCRIPTION OF THE INVENTION

Problem(s) to be Solved by the Invention

When boring a drilling hole with a drill having such a guide portion, the guide portion is in sliding contact with the inner wall face of the drilling hole, and guides the cutting edge section. In this situation, the aforementioned skipping rope phenomenon causes the deflection of the drill body, and thus the deflected drill body makes the guide portion press hard against the inner wall face. Thereby, the inner wall face is damaged, and the surface roughness thereof increases.

Further, for example, if this drill is used to form an injection hole of a fuel injection engine, the inner wall surface of the hole may be damaged, and the surface roughness thereof may increase. In this case, there is a risk that the fuel injection into the combustion chamber will be disturbed and that such a disturbance will inhibit even combustion in the chamber.

This invention was made against the aforementioned background and aims to provide a drill in which:

the guide portion can protect the drilling hole against the skipping rope phenomenon in order to prevent the drilling hole from curving; and the inner wall face of the drilling hole can also be prevented from being damaged, with the result that the surface roughness of the hole is improved.

Means for Solving the Problem

In order to solve the aforementioned problem and also to accomplish these aims, the drill in the present invention comprises features wherein:

the drill body has a stick shape, and is rotatable on an axis;

chip evacuating flutes are formed in the periphery of the drill body from the front flanks toward a rear side;

cutting edges are formed along ridge lines where the front flanks and wall faces intersect with each other;

the wall faces are in the chip evacuating flutes and face the drill rotational direction;

the cutting edge section in the front side, namely, in the tip side of the drill body, has an external diameter which is smaller toward the rear side in the axis direction than the external diameter at the cutting edges;

a guide portion is provided to the rear side of the cutting edge section;

the guide portion has a maximum external diameter part on the front periphery side thereof;

the external diameter at the maximum external diameter part is larger than the external diameter at the rear of the cutting edge section, and is smaller than or equal to the external diameter at the cutting edges; and the maximum external diameter part of the guide portion shows a smooth convex curve shape in a figure showing a revolution, that is, a rotatory figure and/or a rotatory trajectory, obtained by rotating the drill body on the axis.

Regarding such a drill, the above guide portion is provided to the rear side of the cutting edge section for boring a drilling hole in a workpiece. Thus, when such a guide portion is inserted into the drilling hole, the guide portion slidingly contacts the inner wall face of the drilling hole, whereupon the cutting edge section is guided along the inner wall face of the drilling hole and goes levelly in the axis direction. Therefore, this state can prevent the drilling hole from being curved due to the skipping rope phenomenon. Further, the maximum external diameter part of the guide portion to be in sliding contact with the inner wall face of the drilling hole has a smooth convex curve shape in a rotatory figure obtained by rotating it on the axis. Thus, even if the maximum external diameter part pushes the inner wall face, the maximum external diameter part does not bite the inner wall face. Therefore, the inner wall is prevented from being damaged, with the result that the surface roughness of the inner wall face of the drilling hole can be improved.

The maximum external diameter part of the guide portion has a smooth convex curve shape as previously mentioned. Thereby, when inserting the guide portion into the drilling hole, the inserting operation can be smoothly performed as previously mentioned, and also the cutting edge section can be properly guided.

On the other hand, when inserting the guide portion into the drilling hole, the inserting operation also may apply an impact thereto. Further, when the maximum external diameter part is in sliding contact with the inner wall face of the drilling hole, the sliding contact also may apply a sliding load thereto. However, the maximum external diameter part has a convex curve shape as previously mentioned. This shape effectively distributes the impact and sliding load, and also acts as a buffer against them. Thus, the shape can prevent the guide portion from damage caused by the impact and sliding load.

It is preferable that the convex curve of the maximum external diameter part of the guide portion has a curvature radius within a range of from 0.1 mm to 0.5 mm in a rotatory figure obtained by rotating it on the axis.

If the curvature radius is so short as to be under this range, the maximum external diameter part becomes only a point rather than a curve and then this point hits and contacts the inner wall face of the drilling hole in this state. Thus, there is a risk that the point will damage the inner wall face.

On the other hand, if the curvature radius is so long as to be over this range, the contact length of the maximum external diameter part with the inner wall face of the drilling hole becomes too long. Thus, there is a risk that the sliding load will increase.

Further, it is preferable that:
the external diameter of the guide portion rearward in the axis direction is smaller than the external diameter at the maximum external diameter part: and
two or more guide portions are provided to the rear side of the cutting edge section in the axis direction.

With this structure, at each guide portion, the sliding load which is caused by the sliding contact and is applied to the inner wall face of the drilling hole from the maximum external diameter part, can be decreased. Therefore, with this structure, the two or more guide portions can properly guide the cutting edge section in the front of the drill.

Further, in the above case in which:
the two or more guide portions are provided to the rear side of the cutting edge section in the axis direction; and
the maximum external diameter part of the rearmost guide portion among these guide portions is preferably arranged at a position where the distance from the front of the cutting edge section in the axis direction is within L/2.

L is the flute length, i.e. the length of the chip evacuating flutes from the front of the cutting edge section in the axis direction. If the position of the maximum external diameter part of the rearmost guide portion is over L/2 from the front of the cutting edge section in the axis direction, there is a risk that the sliding load will increase.

Effect of the Invention

From the explanation above, using the drill of the present invention, the guide portion can guide the cutting edge section levelly in the axis direction, whereby the linearity of the drilling hole can be ensured. Also, the sliding contact of the guide portion prevents the inner wall face of the drilling hole from being damaged, with the result that the surface roughness of the inner wall face of the drilling hole can be improved. Therefore, even if the drill is used to form an injection hole in a fuel injection engine for example, the drill can bore levelly and precisely to form an extremely level injection hole, with the result that the injection hole enables even combustion in the combustion chamber to be accelerated without any disturbance in the fuel injection.

(The shapes and the back tapers of cutting edge section 2 and guide portion 6 are simplified or emphasized in the views.)

DESCRIPTION OF NOTATIONS

1 DRILL BODY
2 CUTTING EDGE SECTION
2A CUTTING EDGE
3 FRONT FLANK
4 CHIP EVACUATING FLUTE
5 LAND
5A FIRST MARGIN
5B SECOND MARGIN
6 GUIDE PORTION
6A MAXIMUM EXTERNAL DIAMETER PART OF GUIDE PORTION 6
O AXIS OF DRILL BODY 1
T DRILL ROTATIONAL DIRECTION
D EXTERNAL DIAMETER AT CUTTING EDGE 2A
R CURVATURE RADIUS OF CONVEX CURVE FORMED AT MAXIMUM EXTERNAL DIAMETER PART 6A OF GUIDE PORTION 6
L FLUTE LENGTH, NAMELY, LENGTH OF CHIP EVACUATION FLUTE, FROM FRONT OF CUTTING EDGE SECTION 2 TOWARD REAR SIDE IN DIRECTION OF AXIS O

BEST MODE OF CARRYING OUT THE INVENTION

Figure 1:
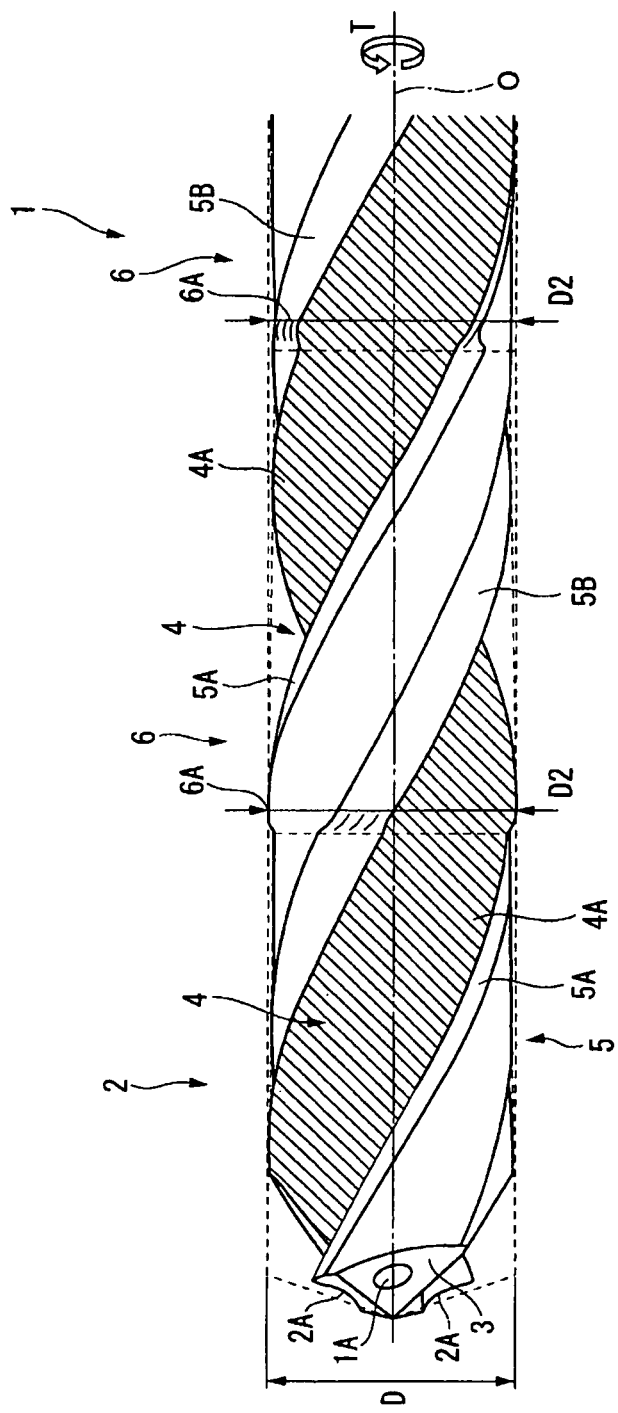
FIG. 1 is a side view showing the front portion of one embodiment of the drill body 1 of the present invention.
Figure 2:
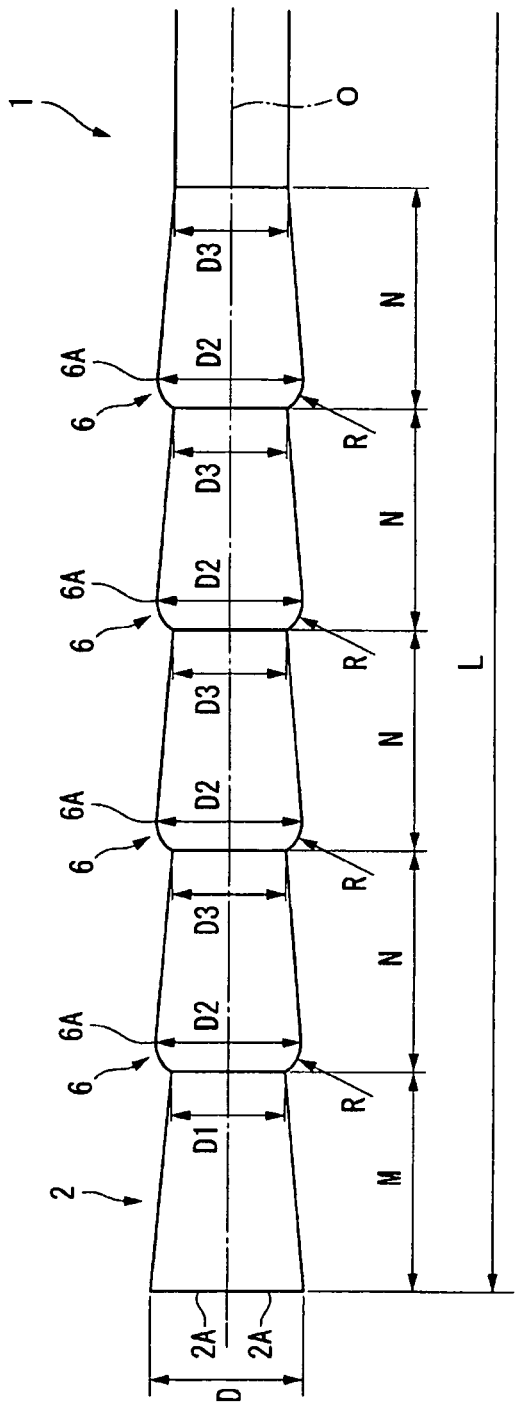
FIG. 2 is an outline view showing the rotatory figure of the front portion of one embodiment of the drill body 1 shown in FIG. 1, obtained by rotating the drill body 1 on the axis O.

FIG. 1 and FIG. 2 show one embodiment in a case in which the present invention is applied to a solid carbide drill, i.e., a drill which is made solely of cemented carbide. In this embodiment, a drill body 1 is integrally formed as a single unit with a hard material such as the cemented carbide, has an almost columnar shape around an axis O as the center axis thereof, and has a shank in the rear portion not shown in the figures (the shank is provided in a portion that is further to the right than the portions shown in FIGS. 1 and 2). The shank is fixed to the spindle of a machining tool. Further, when rotating the drill body 1 in a drill rotational direction T on the axis O, and then feeding the drill body 1 along the axis O toward its front side (left side in FIGS. 1 and 2), cutting edges 2A provided in a cutting edge section 2 located in the front side of the drill body 1 bore a drilling hole into the workpiece.

Chip evacuating flutes 4 are formed in the periphery of the front portion of the drill body 1 shown in FIGS. 1 and 2. The chip evacuating flutes 4 have a shape which is helical to the rear in the drill rotational direction T around the axis O, namely a right-handed helical tooth shape, and are formed rearward from front flanks 3 to the front end of the shank of the drill body 1, for example. The cutting edges 2A are formed along ridge lines where the front flanks 3 intersects with wall faces 4A which face in the drill rotational direction T.

Further, in the front portion of the drill body 1,
the chip evacuating flutes 4 as a pair are formed to be rotationally symmetrical with respect to the axis O at the angle of 180°; and
the cutting edges 2A as a pair are also formed to be rotationally symmetrical with respect to the axis O at the angle of 180°.

Lands 5 are located between the chip evacuating flutes 4 in the circumferential direction. Coolant holes 1A go through the drill body 1 from the rear side of the shank to the front flanks 3, are opened there, and are helical in the same manner as the chip evacuating flutes 4.

Further, in this embodiment, first margins 5A intersected with the wall faces 4A are formed along rims at the forward side of the lands 5 in the drill rotational direction T. The wall faces 4A are in the chip evacuating flutes 4, and face in the drill rotational direction T.

On the other hand, second margins 5B intersected with the wall faces are formed along rims at the backward side (heel side) of the land 5 in the drill rotational direction T. The wall faces are adjacent to the backward side of the land 5 in the drill rotational direction T, and face in the opposite direction to the drill rotational direction T.

A cross sectional view perpendicular to the axis O shows that:
both of the first margins 5A and the second margins 5B have arc shapes in which the axis O is their common center point and their external diameters are the same; and
the external diameter of circumferences of the lands 5 between the first margins 5A and the second margins 5B is slightly smaller than the abovementioned external diameters of the circumferences of the first margins 5A and the second margins 5B.

Further, a back taper is provided in the cutting edge section 2 in the front side of the drill body 1. The incline of the back taper is, as an example, within a range of 0.15/100 to 0.2/100. In other words, the aforementioned external diameters gradually decrease with the above incline from the ridge lines at the front flanks 3 toward the rear side. Therefore, an external diameter D1 at the rear of the above cutting edge 2 is slightly smaller than an external diameter D at the cutting edges 2A.

Additionally, a guide portion 6 is provided to the rear side of the cutting edge section 2. The guide portion 6 has the maximum external diameter part 6A at the front side thereof. The external diameter D2 at the maximum external diameter part 6A is larger than the external diameter D1 at the rear of the cutting edge 2, and is smaller than or equal to the external diameter D at the cutting edges 2A. The maximum external diameter part 6A of the guide portion 6 is shaped to be a smooth convex curve shape in a rotatory figure obtained by rotating it on the axis O.

In other words, in the front side of the drill body 1, the section from the cutting edges 2A at the frontmost side thereof to the guide portion 6 having the external diameter D1, is the cutting edge section 2 in this embodiment.

In this embodiment, the first and second margins 5A and 5B of the guide portion 6 in the rotatory figure on the axis O are shown as a shape in which:
from the rear of the cutting edge section 2 to the maximum external diameter part 6A. the shape is a convex arc with a radius R, and the external diameter thereof increases radially outward in proportion to the rear direction;
from the maximum external diameter part 6A to a proximity point extremely close to it, the shape is still the convex arc with the radius R, and the external diameter thereof slightly decreases radially inward in proportion to the rear direction;
from the above proximity point toward the rear side, the shape is a straight line which is smoothly connected with the convex arc at the above proximity point and goes toward the rear side, and the external diameter thereof decreases racially inward in proportion to the rear direction.

Thus, the maximum external diameter part 6A as above is arranged at the front side of the guide portion 6. Also, the radius R is within a range of from 0.1 mm to 0.5 mm in this embodiment.

Therefore, in the guide portion 6, a back taper is also provided in the first and second margins 5A and 5B to be more rearward than the convex arc shaped by the maximum external diameter part 6A. The incline of the back taper is, as an example, within a range of 0.10/100 to 0.15/100. This incline is more gradual than that of the back taper provided in the cutting edge section 2 as previously mentioned. Also, in this embodiment, the above provided back taper makes an external diameter D3 at the rear of the guide portion 6 smaller than the external diameter D2 at the maximum external diameter part 6A. However, the external diameter D3 at the rear of the guide portion 6 is equal to the external diameter D1 at the rear of the cutting edge section 2 in this embodiment.

Further, in this embodiment, a plurality (four in FIG. 2) of such guide portions 6 is provided to the rear side of the cutting edge section 2 in a line along the axis O. Each of the guide portions 6 has the same shape and the same size in a rotatory figure obtained by rotating them on the axis O. Furthermore, in the rotatory figure, from the rear of the guide portion 6 with the external diameter D3, to the maximum external diameter part 6A of the next rearward guide portion 6, the shape is the convex arc as previously mentioned and rises steeply radially outwardly. In other words, the external diameter thereof increases radially outwardly in proportion to the rear direction. Therefore, the maximum external diameter parts 6A are arranged at intervals of a constant length in the axis O direction.

The maximum external diameter part 6A of the rearmost guide portion 6 among these plural guide portions 6 formed therein, is arranged at a position where the distance from the front of the cutting edge section 2 in the axis O is within a range of from L/3 to L/2. L means flute length L, i.e. the length of the drill body where the chip evacuating flutes 4 are formed from the frontmost part to the front of the shank of the drill body 1 in the axis O direction. Thus, no guide portion 6 is arranged in a more rearward area than the rearmost guide portion 6; the drill body 1 has a cylindrical shape with the external diameter D3 in a rotatory figure obtained by rotating the drill body 1 on the axis O as shown in FIG. 2; and the chip evacuating flutes 4 formed in this shape extend to the front of the shank.

Further, in this embodiment, the ratio of L to D, i.e., the ratio L/D is more than 10. L means the flute length L, i.e. the length of the chip evacuating flutes 4 from the front of the cutting edge section 2 in the axis O direction. D means the external diameter D at the cutting edge 2A. Also, the external diameter D at the cutting edge 2A is, as an example, within a range of from 0.1 mm to 6 mm. In other words, the drill in this embodiment is a solid drill (two-flute twist drill) with a small diameter and a long length.

Furthermore, the ratio of M to D, i.e., the ratio M/D is within a range of from 2 to 5. M is the length of the cutting edge section 2 in the axis O direction, and is shorter than the lead of the chip evacuating flutes 4. The lead means the axial advance of a leading edge in one turn around the circumference.

Also, the ratio of N to D, i.e., the ratio N/D is within a range of from 1 to 4. N is the length of each guide portion 6 in the axis O direction, and is slightly smaller than M which is the length of the cutting edge section 2 in this embodiment.

Concerning the drill having the above construction, by feeding the drill body 1 into a drilling hole to be bored, the guide portions 6 provided to the rear side of the cutting edge section 2 are inserted into the drilling hole following the cutting edge section 2; and each maximum external diameter part 6A slidingly contacts the inner wall face of the drilling hole.

On the other hand, in this sliding process, the inner wall face of the drilling hole supports the cutting edge section 2 to locate it at the center of the drilling hole. That is, the center axis of the drilling hole is coaxial with the axis O in the cutting edge section 2, and then the cutting edge section 2 is guided by this sliding process. Thus, the drilling hole can be bored levelly along the axis O even if a skipping rope phenomenon, in which a section of the drill body 1 between the guide portion 6 and the shank vibrates and is deflected radially outward, occurs. In other words, the drilling hole can be prevented from curving, with the result that the linearity and the straightness of the drilling hole can be improved.

Additionally, concerning the drill having the above construction, the maximum external diameter part 6A of the guide portion 6 is formed to show the smooth convex curve shape (convex arc shape) in a rotatory figure obtained by rotating it on the axis O. Thus, as previously mentioned, when the maximum external diameter part 6A is slidingly contacting the inner wall face of the drilling hole, the maximum external diameter part 6A does not bite the workpiece, and also does not damage the inner wall face of the drilling hole. The surface roughness of the inner wall face of the drilling hole can be improved. Therefore, in a case in which the drill is used for boring an injection hole in a fuel injection engine, the drill can form an injection hole which does not disturb the fuel injection and enables even combustion to be accelerated.

Additionally, the maximum external diameter part 6A of the guide portion 6 has the smooth convex curve shape. Thus, when inserting the guide portion 6 into the drilling hole, this smooth convex curve shape prevents the guide portion 6 from being stuck therein and allows the guide portion 6 to slide smoothly. Therefore, the guide portion 6 can be smoothly inserted therein, and then can guide the cutting edge section 2 properly with a prompt movement.

Further when inserting the guide portion 6 into the drilling hole, this inserting operation may apply an impact thereto. Furthermore, when the maximum external diameter part 6A is slidingly contacting the inner wall face, this sliding contact also may apply a sliding load thereto. However, the smooth convex curve shape of the guide portion 6 can distribute this impact and load, and can also act as a buffer against them. Thus, this shape can prevent damage, for example a fracture, to the guide portion 6.

In this embodiment, the convex curve of the maximum external diameter part 6A of the guide portion 6 in a rotatory figure obtained by rotating it on the axis O has a curvature radius R within the range of from 0.1 mm to 0.5 mm. This range enables the aforementioned advantages to be firmly established. If the curvature radius is so short as to be under this range, the maximum external diameter of part 6A becomes only a point rather than a curve, and then this point hits and contacts the inner wall face of the drilling hole in this state. Thus, there is a risk that the point will bite the inner wall face and damage it. On the other hand, if the curvature radius is so long as to be over this range, the contact length of the maximum external diameter part 6A with the inner wall face of the drilling hole becomes too long. Thus, while rotating the drill body 1, the sliding load applied thereto increases. In particular with the drill having a small diameter as mentioned above, there is a risk that the drill body 1 will break off.

In this embodiment:
the two or more guide portions 6 are provided to the rear side of the cutting edge section 2 in the axis O direction;
the maximum external diameter parts 6A are arranged at each front side of these guide portions 6; and
since back tapers are respectively provided further to the rear than each maximum external diameter part 6A, the external diameter therein is smaller than that at each maximum external diameter part 6A.

Therefore, in comparison with an example case where the guide portion 6, across its length, has same external diameter as the external diameter at the maximum external diameter part 6A, the contact length between the maximum external diameter part 6A and the inner wall face of the drilling hole becomes shorter than that of the above example case. Further, even if the contact length is short, the two or more guide portions 6 aforementioned enable the cutting edge section 2 to be guided properly, with the result that the linearity of the drilling hole can be considerably improved.

Further, in this embodiment, in the above case in which the two or more guide portions 6 are provided, the maximum external diameter part 6A of the rearmost guide portion 6 among these guide portions 6 is arranged at a position where the distance from the front of the cutting edge section 2 in the axis direction O is within L/2. L is the flute length, i.e. the length of the chip evacuating flutes 4 in the axis O direction. Thereby, this arrangement makes a rotational load caused by rotating the drill body 1 decrease, whereby the cutting edge section 2 can be properly guided.

Once the drill body 1 has been inserted into a drilling hole, and the depth of the hole has become greater than half of the flute length L, if a skipping rope phenomenon occurs further to the rear side, this phenomenon will not influence the cutting edge section 2 in the front side. If a guide portion 6 is arranged further to the rear than L/2, an increase in the rotational load caused by such guide portion 6 is a risk rather than the skipping rope phenomenon.

In this embodiment, since the two or more guide portions 6 are arranged within L/2, namely, the half of the flute length L, from the front of the cutting edge section 2, these guide portions 6 can ensure that the cutting edge section 2 is level.

In this embodiment, the maximum external diameter part 6A of each guide portion 6 has a convex arc shape in a rotatory figure obtained by rotating it on the axis O. Further, the external diameter of this convex arc shape increases radially outward in proportion to the rear direction from the rear of the cutting edge section 2 or from the rear of the next guide portion 6 provided at the front. However, the shape in the rotatory figure is not limited to a convex arc shape, but most other smooth convex curves, for example a convex elliptical curve, are usable as the shape.

Further, in the rotatory figure, concerning a portion frontward adjacent to the maximum external diameter part 6A: from the rear of the cutting edge section 2 or from the rear of the next guide portion 6 provided at the front, to the maximum external diameter part 6A; a linear shape or a concave curve shape with its external diameter increasing radially outward in proportion to the rear direction, is also usable for the shape around such a portion.

In this embodiment, the two or more guide portions 6 are arranged at intervals of a constant length in the axis O direction. In addition to this arrangement, it is also possible to use variable intervals to arrange the two or more guide portions 6.

For example, regarding the guide portions 6 positioned in the rear side of the drill body 1, the maximum external diameter parts 6A thereof are arranged at intervals of a longer length in the axis O direction.

On the other hand, regarding the guide portions 6 close to the cutting edge section 2 in the front side of the drill body 1, the maximum external diameter parts 6A thereof are arranged at intervals of a shorter length in the axis O direction. Thus, such variable intervals make the load decrease, and also make the guiding performance of the cutting edge section 2 increase noticeably.

Furthermore, in this embodiment, in the peripheries of the land 5 of the drill body 1, first margins 5A are provided to the forward sides of the lands 5 in the drill rotational direction T, and also second margins 5B are provided to the backward sides of the lands 5 in the drill rotational direction T.

The first margins 5A and the second margins 5B show the aforementioned convex curve shape in the rotary figure, and this shape is then the shape of the maximum external diameter parts 6A in the guide portion 6.

For example, it is possible to use in a case in which:
only the first margins 5A are provided;
the guide portions 6 are formed on such first margins 5A; and
the peripheries of the land 5 to the backward sides of the first margins 5A in the drill rotational direction T are flanks which sink radially inward for the first margins 5A.

Further, for example, another case is also usable, in which:
the entire peripheries of the land 5 from the first margins 5A to the second margins 5B are margins which have an arc shape with its center as the axis O in a cross section perpendicular to the axis O;
the margins show a convex curve shape in the rotatory figure; and
this shape is the shape of the maximum external diameter parts 6A in the guide portion 6.

INDUSTRIAL APPLICABILITY

Regarding the drill of the present invention, the guide portion can guide the cutting edge section levelly in the axis direction, and the linearity of the drilling hole can be ensured. Also, the sliding contact of the guide portion prevents the inner wall face of the drilling hole from being damaged, with the result that the surface roughness of the inner wall face of the drilling hole can be improved.

For example, even if the drill is used for forming an injection hole of a fuel injection engine, the drill can bore levelly and precisely an extremely level injection hole, with the result that this injection hole enables even combustion in the combustion chamber to be accelerated without any disturbance in the fuel injection.

The invention claimed is:

1. A drill comprising a drill body which has a stick shape and is rotatable on an axis; wherein:
chip evacuating flutes are formed in a periphery of the drill body from front flanks toward a rear side;
cutting edges are formed along ridge lines where the front flanks and wall faces intersect with each other;
the wall faces are in the chip evacuating flutes and face in a drill rotational direction;
a cutting edge section in a front side of the drill body has an external diameter smaller toward the rear side in the axis direction than an external diameter at the cutting edges;
a guide portion is provided to the rear side of the cutting edge section;
the guide portion has a maximum external diameter part on the front periphery side thereof;
an external diameter at the maximum external diameter part is larger than the external diameter at the rear of the cutting edge section, and is smaller than or equal to the external diameter at the cutting edges; and characterized by:
the maximum external diameter part of the guide portion shows a smooth convex curve shape in a rotatory figure obtained by rotating the drill body on the axis,
wherein a plurality of the guide portions are provided to the rear side of the cutting edge section, each of the guide portions having the same shape and size in the rotary figure,
wherein the rear of each guide portion has an external diameter smaller than the external diameter at the maximum external part, and
wherein the shape is:
a convex arc with a radius from the rear of the cutting edge section to the maximum external diameter part of the next rearward guide portion, and the external diameter thereof increases radially outward in proportion to the rear direction;
the convex arc with the radius from the maximum external diameter part to a proximity point extremely close to the point, and the external diameter thereof slightly decreases radially inward in proportion to the rear direction;
a straight line, which is smoothly connected with the convex arc at the proximity point and goes toward the rear side, from the proximity point toward the rear side, and the external diameter thereof decreases radially inward in proportion to the rear direction; and
another convex curve shape from the rear of the guide portion to the maximum external diameter part of the next rearward guide portion.

2. A drill according to claim 1, wherein the convex curve of the maximum external diameter part of the guide portion has a curvature radius within a range of from 0.1 mm to 0.5 mm in a rotatory figure obtained by rotating it on the axis.

3. A drill according to claim 1, wherein:
an external diameter of the guide portion rearward in the axis direction is smaller than the external diameter at the maximum external diameter part; and
two or more guide portions are provided to the rear side of the cutting edge section in the axis direction.

4. A drill according to claim 1, wherein:
two or more guide portions are provided to the rear side of the cutting edge section in the axis direction;
a maximum external diameter part of the rearmost guide portion among these guide portions is arranged at a position where the distance from the front of the cutting edge section in the axis direction is within L/2; and
L is the length of the chip evacuating flutes in the axis direction.

5. A drill according to claim 2, wherein:
an external diameter of the guide portion rearward in the axis direction is smaller than the external diameter at the maximum external diameter part; and
two or more guide portions are provided to the rear side of the cutting edge section in the axis direction.

6. A drill according to claim 2, wherein:
two or more guide portions are provided to the rear side of the cutting edge section in the axis direction;
a maximum external diameter part of the rearmost guide portion among these guide portions is arranged at a position where the distance from the front of the cutting edge section in the axis direction is within L/2; and
L is the length of the chip evacuating flutes in the axis direction.

7. A drill according to claim 3, wherein:
the two or more guide portions are provided to the rear side of the cutting edge section in the axis direction;
a maximum external diameter part of the rearmost guide portion among these guide portions is arranged at a position where the distance from the front of the cutting edge section in the axis direction is within L/2; and
L is the length of the chip evacuating flutes in the axis direction.

8. A drill according to claim 5, wherein:
the two or more guide portions are provided to the rear side of the cutting edge section in the axis direction;
a maximum external diameter part of the rearmost guide portion among these guide portions is arranged at a position where the distance from the front of the cutting edge section in the axis direction is within $L/2$; and
L is the length of the chip evacuating flutes in the axis direction.

9. A drill according to claim 3, wherein:
a back taper is provided to a first margin and a second margin, which are between the chip evacuating flutes, in the cutting edge section in the front side of the drill body.

* * * * *